US010050546B1

United States Patent
Choi et al.

(10) Patent No.: US 10,050,546 B1
(45) Date of Patent: Aug. 14, 2018

(54) APPARATUS FOR CONTROLLING LLC CONVERTER

(71) Applicants: Hyundai Motor Company, Seoul (KR); Kia Motors Corporation, Seoul (KR)

(72) Inventors: Gyu Tae Choi, Gunpo-Gyeonggi-do (KR); Hyun Wook Seong, Gyeonggi-do (KR); Hyung Bin Ihm, Seoul (KR); Gi Bong Son, Gyeonggi-do (KR); Hui Sung Jang, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/810,563

(22) Filed: Nov. 13, 2017

(30) Foreign Application Priority Data

Jun. 15, 2017 (KR) .................. 10-2017-0075719

(51) Int. Cl.
| | |
|---|---|
| *H02M 1/14* | (2006.01) |
| *H02M 3/335* | (2006.01) |
| *H02M 3/337* | (2006.01) |
| *H02M 3/06* | (2006.01) |
| *H02M 1/42* | (2007.01) |
| *H02M 7/48* | (2007.01) |
| *H02M 1/00* | (2006.01) |

(52) U.S. Cl.
CPC ....... *H02M 3/3376* (2013.01); *H02M 1/4233* (2013.01); *H02M 3/06* (2013.01); *H02M 3/33569* (2013.01); *H02M 2001/0016* (2013.01); *H02M 2007/4815* (2013.01)

(58) Field of Classification Search
CPC ......... H02M 2001/0022; H02M 3/335; H02M 3/33507; H02M 1/14; H02M 1/143; H02M 1/15; H02M 2007/4815; H02M 2007/4818; H02M 7/4826; H02M 2001/0058; H02M 1/4241
See application file for complete search history.

(56) References Cited

U.S. PATENT DOCUMENTS 8,970,154 B2 * 3/2015 Ishikawa ........... H02M 7/53875
                                                                                                318/503
2014/0160805 A1    6/2014   Oh et al.

FOREIGN PATENT DOCUMENTS

| | | |
|---|---|---|
| JP | 2016-019322 A | 2/2016 |
| KR | 10-2010-0011471 A | 2/2010 |

\* cited by examiner

*Primary Examiner* — Gary L Laxton
(74) *Attorney, Agent, or Firm* — Mintz Levin Cohn Ferris Glovsky and Popeo, P.C.; Peter F. Corless

(57) ABSTRACT

An apparatus for controlling an LLC converter is provided. The apparatus includes a current controller that determines a first switching frequency control value of a switching element in the LLC converter to cause an output current detection value of the LLC converter to correspond to a predetermined output current command value. Additionally, a feedforward controller determines a second switching frequency control value for operating the switching element by applying a feedforward control value that corresponds to a ripple component included in an input voltage of the LLC converter to the first switching frequency control value.

12 Claims, 5 Drawing Sheets

APPARATUS FOR CONTROLLING LLC CONVERTER

CROSS REFERENCE TO RELATED APPLICATION

The present application claims priority to Korean Patent Application No. 10-2017-0075719, filed Jun. 15, 2017, the entire contents of which is incorporated herein for all purposes by this reference.

BACKGROUND

Field of the Invention

The present invention relates generally to an apparatus for controlling an LLC converter, and more particularly, to an apparatus for controlling an LLC converter that improves output performance of an on-board charger (OBC) by adjusting an output current to cause the output current to follow an output current command using a switching frequency control value that compensates for a ripple component of an input voltage of the LLC converter.

Description of the Related Art

Recently, as environmental pollution increases, alternative fuel type and fuel consumption reducing type environmentally-friendly vehicles are being actively developed in a field of vehicles instead of oil-fuel based engine-driven vehicles. Typically, environmentally-friendly vehicles such as a plug-in hybrid vehicle and an electric vehicle have an OBC. The OBC is a device that charges a high voltage battery by boosting the voltage of external alternating current (AC) power and by converting the AC power into direct current (DC) power.

Generally, topology of the OBC includes two stages: a power factor correction (PFC) stage and a DC-DC converter stage, and topology of the DC-DC converter stage includes a full-bridge converter or an LLC half-bridge converter. In particular, the LLC half-bridge converter is a type of frequency variable control, whereas a full-bridge converter generally used in the topology of the DC-DC converter stage is a type of variable duty control. The LLC converter stage includes a voltage controller and a current controller which are proportional-integral (PI) controllers, and adjust the voltage and the current of an output-end capacitor in the OBC.

However, due to the characteristics of the OBC, when AC power of 60 Hz is input to the PFC stage, the input voltage of the LLC converter stage may have a waveform applied with a ripple of 120 Hz other than a constant voltage due to limited capacitor capability of the LLC converter stage. Consequently, the output performance of the OBC rapidly decreases as the output current of the LLC converter stage is output along with the ripple component of the input voltage of the LLC converter stage. Further, another problem of the conventional OBC resides is that when the output performance of the OBC decreases, the lifetime of a battery is reduced and battery-charging time and costs are increased.

The foregoing is intended merely to aid in the understanding of the background of the present invention, and is not intended to mean that the present invention falls within the purview of the related art that is already known to those skilled in the art.

SUMMARY

Accordingly, the present invention provides an apparatus for controlling an LLC converter which prevents an output current of the LLC converter from being output along with a ripple component of an input voltage of the LLC converter by adjusting the output current to cause the output current to follow an output current command by determining a switching frequency control value that compensates for a ripple component of the input voltage of the LLC converter, thereby improving output performance of an OBC.

According to one aspect of the present invention, an apparatus for controlling an LLC converter may include: a current controller configured to determine a first switching frequency control value of a switching element in the LLC converter for causing an output current detection value of the LLC converter to follow a predetermined output current command value; and a feedforward controller configured to determine a second switching frequency control value for operating the switching element by applying a feedforward control value that corresponds to a ripple component included in an input voltage of the LLC converter to the first switching frequency control value.

The feedforward controller may include a high pass filter configured to filter an input voltage detection value obtained by detecting the input voltage of the LLC converter, and a gain applier configured to apply a predetermined gain to the high pass filter to output the feedforward control value. The current controller may be configured to apply proportional and integral control to a difference between the output current detection value and the output current command value to generate the first switching frequency control value. The apparatus for controlling the LLC converter may further include a voltage controller configured to generate the output current command value for causing an output voltage detection value of the LLC converter to follow a predetermined output voltage command value.

According to one aspect of the present invention, an OBC system for use in a vehicle may include: an LLC converter having a switch and a resonance circuit in an input-end side thereof and a rectifier implemented as a diode in an output-end side thereof; and an apparatus configured to operate the LLC converter, the apparatus including a current controller configured to determine a first switching frequency control value of a switching element in the LLC converter to cause an output current detection value of the LLC converter to follow a predetermined output current command value, and a feedforward controller configured to determine a second switching frequency control value for operating the switching element by applying a feedforward control value that corresponds to a ripple component included in an input voltage of the LLC converter to the first switching frequency control value.

According to one aspect of the present invention, an OBC system for use in vehicle may include: a power factor compensator configured to rectify an alternating current (AC) voltage input from an outside to convert the AC voltage into a direct current (DC) voltage and output the DC voltage; an LLC converter, including a switch with a switching element causing the DC voltage output from the power factor compensator to be input thereto and the AC voltage to be output to a first side of a transformer via switching, the transformer causing the AC voltage output from the switch to be input via the first side thereof and to be output via a second side thereof by adjusting a voltage level, and a rectifier configured to rectify the AC voltage output from the second side of the transformer to output the DC voltage; and an apparatus configured to operate the LLC converter, the apparatus including a current controller configured to determine a first switching frequency control value of a switching element in the LLC converter to cause an output current detection value of the LLC converter to follow a predetermined output current command value, and a feedforward controller configured to determine a second switching frequency control value for operating the switching element by applying a feedforward control value that corresponds to a ripple component included in an input voltage of the LLC converter to the first switching frequency control value.

The apparatus for controlling the LLC converter of the present invention is advantageous by preventing an output current of the LLC converter from being output along with a ripple component of an input voltage of the LLC converter by adjusting the output current to cause the output current to follow an output current command by determining a switching frequency control value that compensates for the ripple component of the input voltage of the LLC converter, thereby improving output performance of an OBC.

Another advantage of the apparatus for controlling the LLC converter of the present invention resides is that the apparatus increases the lifetime of a battery and reduces battery-charging time and costs due to improvement in output performance of the OBC. A further advantage of the apparatus for controlling the LLC converter resides in that the apparatus determines the output current command of the LLC converter by changing software without addition or modification of a separate hardware, thereby resulting in a reduction in product costs.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Figure 1:
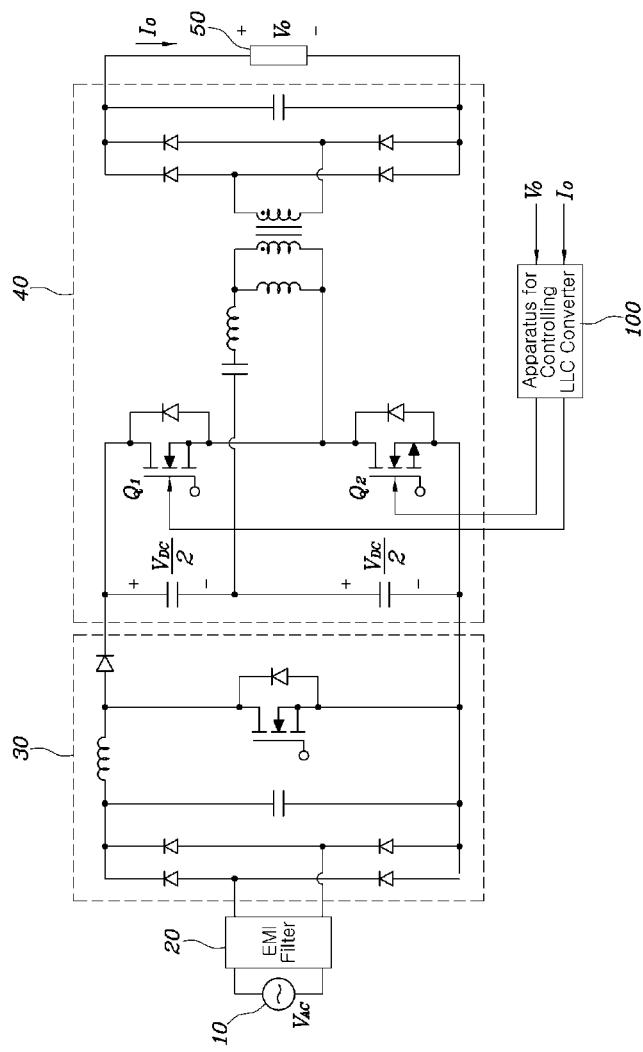
FIG. 1 is a configuration diagram of an OBC system for use in a vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinbelow, exemplary embodiments of the present invention will be described in detail with reference to the accompanying drawings. Throughout the drawings, the same reference numerals will refer to the same or like parts.

FIG. 1 is a configuration diagram of an on-board charger (OBC) for use in a vehicle according to an exemplary embodiment of the present invention. The present invention provides a technology directed to the OBC in environmentally-friendly vehicles, such as a plug-in hybrid vehicle and an electric vehicle which are charged using an external charger. Referring to FIG. 1, the OBC for use in a vehicle according to an exemplary embodiment of the present invention may include an electromagnetic interference (EMI) filter 20, a power factor corrector (PFC) 30, an LLC converter 40, and an apparatus configured to operate the LLC converter 100.

The OBC for use in a vehicle provides an alternating current (AC) voltage 10 from the outside to a load 50 via the EMI filter 20, PFC 30, and the LLC converter 40. For example, the OBC may be configured to supply the AC voltage 10 to the EMI filter 20 and remove high frequency noise from the AC voltage 10 to prevent other control components or devices from operating erroneously due to the high frequency noise. An OBC system according to the present invention may include the PFC 30 and the LLC converter 40 connected to each other in series.

The PFC 30 may be configured to rectify the AC voltage input from the outside to convert the AC voltage into a DC voltage and then output the DC voltage. In particular, the AC voltage 10 of which the high frequency noise is removed by the EMI filter 20 may be input to the PFC 30. Then, the PFC 30 may be configured to rectify the AC voltage into a DC voltage at a rectifier including a plurality of diodes and may provide the rectified DC voltage to the LLC converter 40.

The LLC converter 40 may include a resonance circuit and a switch that includes switching elements Q1, Q2 configured to receive the DC voltage output from the PFC 30 and output the AC voltage to a first side of a transformer via switching. Further, the LLC converter 40 may include the transformer configured to receive the AC voltage output from the switch at the first side thereof and adjust the voltage level of the AC voltage and output the AC voltage via a second side thereof, and a rectifier configured to rectify the AC voltage output from the second side of the transformer and outputs a DC voltage. Herein, the DC voltage $V_{DC}$ is the sum of the voltages of multiple capacitors that are connected in series in a converter circuit.

Further, the LLC converter 40 may be implemented by applying an LLC resonance-type half-bridge topology, a full-bridge topology, or other topologies. The LLC converter 40 shown in FIG. 1 is an example to which the LLC resonance-type half-bridge topology is applied. Further, the LLC converter 40 according to the present invention may be configured to apply the half-bridge topology which is a type of frequency variable control. The converter circuit of any topology may adjust the levels of the output voltage and the output current via on/off control of the switching elements according to an exemplary embodiment of the present invention.

The OBC system, which is implemented by the LLC converter according to an exemplary embodiment of the present invention, is a type of apparatus configured to adjust the output current and the output voltage by varying the switching frequency within an operating range (e.g., a controllable range). For example, it is necessary to change a characteristic curve in each load range and to operate at an LLC resonance point that is an inflection point of each characteristic curve to achieve a maximum output. Therefore, the present invention may operate at a maximum efficiency by variably adjusting the switching frequency to cause the frequency to reach the resonance point.

However, due to characteristics of the OBC, when AC power of about 60 Hz is input to the PFC stage and is output to the LLC converter stage, a waveform applied with a ripple of about 120 Hz other than a constant voltage output from the PFC stage may be output as an input voltage to the LLC converter stage, due to limited capacitor capability of the LLC converter stage. The output current from the LLC converter stage may be output along with the ripple component of the DC link voltage which is the input voltage of the LLC converter, thereby resulting in a rapid decrease in the output performance of the OBC.

Accordingly, the present invention provides an apparatus for controlling an LLC converter whereby the ripple component of the input voltage of the LLC converter 40 is efficiently compensated to cause the output current to follow the output current command, thereby preventing the ripple component included in the input voltage $V_{DC}$ of the LLC converter 40 from being output along with the output current and allowing the output current to follow the output current command. As shown in FIG. 1, the apparatus for controlling the LLC converter 100 may be provided with the input voltage $V_{DC}$ in the LLC converter input stage and with the output voltage $V_O$ and the output current $I_O$ in the LLC converter output stage, which are adjusted and provided to the switching elements Q1, Q2 of the LLE converter 40, thereby adjusting the output current of the LLC converter 40 to correspond to an output current command.

Figure 2:
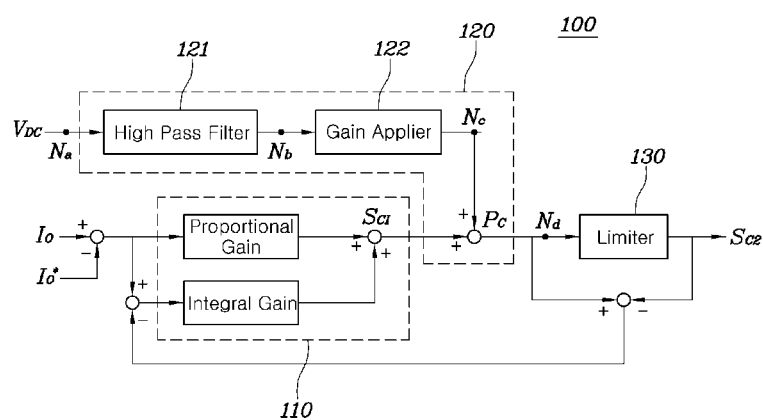
FIG. 2 is a configuration diagram of an apparatus for controlling an LLC converter in an OBC system for use in a vehicle according to an exemplary embodiment of the present invention.

Detailed operations of the apparatus for controlling the LLC converter 100 will be described referring to FIGS. 2 to 5. FIG. 2 is a configuration diagram of an apparatus for controlling an LLC converter in an OBC system for use in a vehicle according to an exemplary embodiment of the present invention. Referring to FIG. 2, the apparatus for controlling the LLC converter 100 according to an exemplary embodiment of the present invention may include a voltage controller (not shown), a current controller 110, and a feedforward controller 120.

First, the voltage controller may be configured to generate an output current command value $I_O^*$ to cause an output voltage detection value $V_O$ of the LCC converter 40 to correspond to a predetermined output voltage command value $V_O^*$. Herein, the output voltage command value $V_O^*$ may be provided from the outside (e.g., an upper level controller). For example, the voltage controller may be configured to apply proportional-integral (PI) control to a difference between the output voltage command value $V_O^*$ and the output voltage detection value $V_O$ in the LLC converter 40, thereby generating the output current command value $I_O^*$.

Hereinafter, the voltage controller may be configured to provide the generated output current command value $I_O^*$ to the current controller 110. The current controller 110 may then be configured to determine a first switching frequency control value $S_{C1}$ of the switching element within the LLC converter 40 for causing an output current detection value $I_O$ to follow the predetermined output current command value $I_O^*$. The output current command value $I_O^*$ may be provided from the voltage controller or from the outside (e.g., an upper level controller). Further, the first switching frequency control value $S_{C1}$ refers to a switching frequency value which controls the switching elements Q1, Q2 to adjust the output current of the LLC converter 40.

In particular, the current controller 110 may be configured to apply proportional-integral (PI) control to a difference between the output current detection value $I_O$ and the output current command value $I_O^*$, thereby determining the first switching frequency control value $S_{C1}$. For example, the current controller 110 may be configured to generate the first switch frequency control value $S_{C1}$ by calculating a difference value between the output current detection value $I_O$ of the LLC converter 40 and the output current command value $I_O^*$, and calculating each control value by applying a proportional gain and an integral gain to the calculated gain value, and then summing the control values.

Further, the feedforward controller 120 may be configured to determine a second switching frequency control value $S_{C2}$ for operating the switching elements Q1, Q2 by applying a feedforward control value $P_C$ that corresponds to a ripple component included in the input voltage of the LLC converter 40 to the first switching frequency control value $S_{C1}$. For example, the feedforward controller 120 may include a high pass filter (HPF) 121 and a gain applier 122 shown in FIG. 2, to generate the feedforward control value Pc. The high pass filter 121 may be configured to filter an input voltage detection value obtained by detecting the input voltage $V_{DC}$ of the LLC converter 40 to extract a ripple (noise) component of the input voltage detection value.

The feedforward controller 120 may then be configured to provide the ripple component extracted from the high pass filter 121 to the gain applier 122. The gain applier 122 may be configured to output the feedforward control value Pc by applying a predetermined gain to the ripple component extracted from the high pass filter 121. Herein, the predetermined gain refers to a control method in which the input is controlled using standard input information. Therefore, the gain applier 122 may be configured to output the feedforward control value Pc obtained by adjusting the magnitude of the ripple component to decrease the ripple component.

Thereafter, the feedforward controller 120 may be configured to determine the switching frequency control value $S_{C2}$ for operating the switching element of the LLC converter 40 by applying the feedforward control value Pc to the first switching frequency control value $S_{C1}$ of the current controller 110. Herein, the second switching frequency control value $S_{C2}$ refers to the switching frequency value obtained by compensating, i.e., reducing the ripple component of the processed input voltage. Further, a limiter 130 may be selectively provided to limit the second switching frequency control value $S_{C2}$ to adjust the value $S_{C2}$ to be within a predetermined range.

When the second switching frequency control value $S_{C2}$ is beyond the predetermined range, the apparatus for controlling the LLC converter 100 may be configured to calculate a difference value between the second switching frequency control value $S_{C2}$ and a value obtained by applying the feedforward control value Pc to the first switching frequency control value $S_{C1}$, thereby adjusting the second switching frequency control value $S_{C2}$ to cause the value to be within the predetermined range. Subsequently, the apparatus for controlling the LLC converter 100 may be configured to feedback the calculated difference value to the current controller 110 to cause the current controller 110 to generate the first switching frequency control value $S_{C1}$ which is applied with the feedbacked difference value in advance. Similarly, the apparatus for controlling the LLC converter 100 may be configured to process the ripple component included in the input voltage and apply the ripple component to the switching frequency control value generated in the current controller 110 to determine the switching frequency control value that compensates for the ripple component. Thus, the apparatus allows the output current to follow the output current command and improves the output performance of the OBC.

Figure 3:
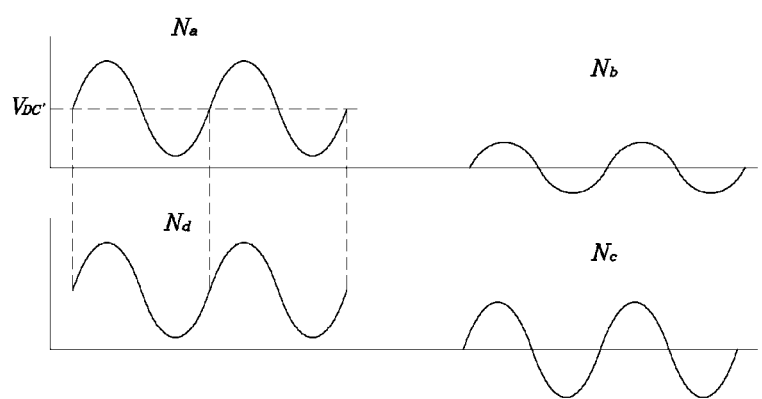
FIG. 3 is an exemplary diagram showing a signal converted by the apparatus for controlling the LLC converter according to the exemplary embodiment of the present invention shown in FIG. 2.

FIG. 3 is an exemplary diagram showing a signal converted by the apparatus for controlling the LLC converter according to an exemplary embodiment of the present invention shown in FIG. 2. Referring to FIG. 3, a node $N_a$ corresponds to a waveform of a voltage which is input to the apparatus for controlling the LLC converter of FIG. 2. As shown in FIG. 3, although it is required to input a complete DC voltage $V_{DC'}$ as the input voltage, a fraction of the AC voltage may remain as an AC voltage without being changed into a DC voltage. Therefore, the input voltage detection value $V_{DC}$ may include the ripple component.

Subsequently, a node $N_b$ corresponds to an output waveform of the high pass filter 121 of FIG. 2. As shown in FIG. 3, the high pass filter 121 may be configured to extract ripple component of the input voltage by filtering the input voltage detection value $V_{DC}$. Further, a node $N_c$ corresponds to an output waveform of the gain applier 122 of FIG. 2. As shown in FIG. 3, the gain applier 122 may be configured to adjust the magnitude of the ripple component of the input voltage extracted by the high pass filter 121 to output the feedforward control value $P_c$.

Subsequently, a node $N_d$ corresponds to an output waveform of the second switching frequency control value $S_{C2}$ which is determined by applying the feedforward control value Pc of FIG. 2 to the first switching frequency control value $S_{C1}$ output from the current controller 110. As shown in FIG. 3, since the second switching frequency control value $S_{C2}$ is compensated by applying the ripple of the input voltage to the first switching frequency control value $S_{C2}$, the phase of the second switching frequency control value $S_{C2}$ may be identical to that of the input voltage. In other words, the waveforms of the second switching frequency control value $S_{C2}$ and the input voltage detection value $V_{DC}$ may have the same characteristics of increasing and decreasing curves.

Figure 4:
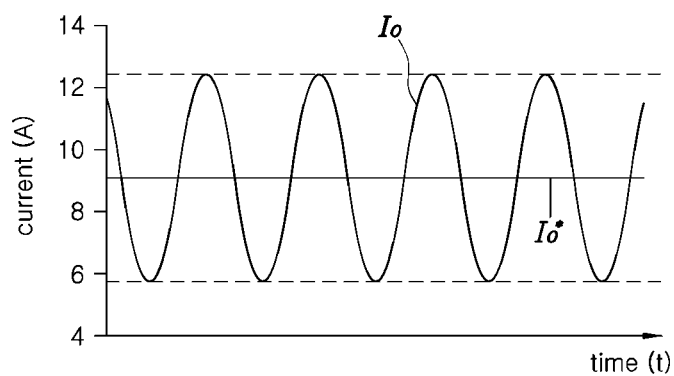
FIGS. 4 and 5 are exemplary diagrams showing a signal output from an LLC converter in an OBC system for use in a vehicle according to an exemplary embodiment of the present invention.
Figure 5:
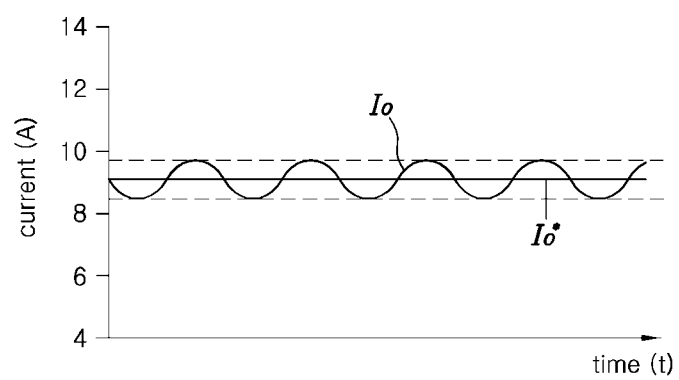

FIGS. 4 and 5 are exemplary diagrams showing a signal output from an LLC converter in an OBC system for use in a vehicle according to an exemplary embodiment of the present invention. FIGS. 4 and 5 correspond to signal waveforms of the current $I_O$ output from the LLC converter of the present invention and the output current command $I_O^*$.

For example, referring to FIG. 4, the output current $I_O$ of conventional LLC converter is unable to correspond to the output current command $I_O^*$, as the output current $I_O$ is output along with the ripple component of the input voltage. Meanwhile, referring to FIG. 5, the output current of the LLC converter according to the present invention may correspond to the output current command $I_O^*$, as the output current is adjusted by the switching frequency control value of the LLC converter which compensates for the ripple of the current by applying the ripple component of the input voltage.

As described above, the exemplary embodiment of the present invention improves the output performance of the OBC compared to the conventional control technology, by determining the switching frequency control value that compensates for the ripple component of the input voltage and by controlling the output current to cause the output current to follow the output current command, thereby preventing the output current from being output along with the ripple component of the input voltage of the LLC converter.

Further, the exemplary embodiment of the present invention may increase the lifetime of a battery and reduce battery-charging time and costs due to improvement in the output performance of the OBC. The exemplary embodiment of the present invention may also determine the output current command of the LLC converter by changing only software without addition or modification of separate hardware, thereby resulting in a reduction in the product costs.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An apparatus for controlling an LLC converter, comprising:
   a current controller configured to determine a first switching frequency control value of a switching element in the LLC converter to cause an output current detection value of the LLC converter to correspond to a predetermined output current command value; and
   a feedforward controller configured to determine a second switching frequency control value for operating the switching element by applying a feedforward control value that corresponds to a ripple component included in an input voltage of the T d C converter to the first switching frequency control value.

2. The apparatus for controlling the LLC converter of claim 1, wherein the feedforward controller includes:
   a high pass filter configured to filter an input voltage detection value obtained by detecting the input voltage of the LLC converter; and
   a gain applier configured to apply a predetermined gain to the high pass filter to output the feedforward control value.

3. The apparatus for controlling the LLC converter of claim 1, wherein the current controller is configured to apply proportional and integral control to a difference between the output current detection value and the output current command value to generate the first switching frequency control value.

4. The apparatus for controlling the LLC converter of claim 1, further comprising:
   a voltage controller configured to generate the output current command value to cause an output voltage detection value of the LLC converter to correspond to a predetermined output voltage command value.

5. An OBC system for use in a vehicle, comprising:
   an LLC converter having a switch and a resonance circuit in an input-end side thereof and a rectifier implemented as a diode in an output-end side thereof; and
   an apparatus configured to operate the LLC converter, the apparatus comprising:
      a current controller configured to determine a first switching frequency control value of a switching element in the LLC converter to cause an output current detection value of the LLC converter to correspond to a predetermined output current command value; and
      a feedforward controller configured to determine a second switching frequency control value for operating the switching element by applying a feedforward control value that corresponds to a ripple component included in an input voltage of the LLC converter to the first switching frequency control value.

6. The system of claim 5, wherein the feedforward controller includes:
   a high pass filter configured to filter an input voltage detection value obtained by detecting the input voltage of the LLC converter; and
   a gain applier configured to apply a predetermined gain to the high pass filter to output the feedforward control value.

7. The system of claim 5, wherein the current controller is configured to apply proportional and integral control to a difference between the output current detection value and the output current command value to generate the first switching frequency control value.

8. The system of claim 5, wherein the apparatus includes a voltage controller configured to generate the output current command value to cause an output voltage detection value of the LLC converter to correspond to a predetermined output voltage command value.

9. An OBC system for use in a vehicle, comprising:
   a power factor compensator configured to rectify an alternating current (AC) voltage input from an outside to convert the AC voltage into a direct current (DC) voltage and output the DC voltage;
   an LLC converter, having a switch with a switching element that causes the DC voltage output from the power factor compensator to be input thereto and the AC voltage to be output to a first side of a transformer via switching, the transformer causing the AC voltage output from the switch to be input via the first side thereof and to be output via a second side thereof by adjusting a voltage level, and a rectifier configured to rectify the AC voltage output from the second side of the transformer to output the DC voltage; and
   an apparatus configured to operate the LLC converter, the apparatus comprising:
      a current controller configured to determine a first switching frequency control value of a switching element in the LLC converter to cause an output current detection value of the LLC converter to correspond to a predetermined output current command value; and
      a feedforward controller configured to determine a second switching frequency control value for operating the switching element by applying a feedforward control value that corresponds to a ripple component included in an input voltage of the LLC converter to the first switching frequency control value.

10. The system of claim 9, wherein the feedforward controller includes:
    a high pass filter configured to filter an input voltage detection value obtained by detecting the input voltage of the LLC converter; and
    a gain applier configured to apply a predetermined gain to the high pass filter to output the feedforward control value.

11. The system of claim 9, wherein the current controller is configured to apply proportional and integral control to a difference between the output current detection value and the output current command value to generate the first switching frequency control value.

12. The system of claim 9, wherein the apparatus includes a voltage controller configured to generate the output current command value to cause an output voltage detection value of the LLC converter to correspond to a predetermined output voltage command value.

* * * * *